(12) United States Patent
Deng

(10) Patent No.: US 8,509,424 B2
(45) Date of Patent: Aug. 13, 2013

(54) FAST KEY-CHANGING HARDWARE APPARATUS FOR AES BLOCK CIPHER

(75) Inventor: Ante Deng, Raleigh, NC (US)

(73) Assignee: Ante Deng, Raleigh, NC (US)

( * ) Notice: Subject to any disclaimer, the term of this patent is extended or adjusted under 35 U.S.C. 154(b) by 759 days.

(21) Appl. No.: 12/618,771

(22) Filed: Nov. 15, 2009

(65) Prior Publication Data

US 2011/0116627 A1    May 19, 2011

(51) Int. Cl.
*H04K 1/00* (2006.01)

(52) U.S. Cl.
USPC .......................................................... 380/28

(58) Field of Classification Search
USPC .......................................................... 380/28
See application file for complete search history.

(56) References Cited

U.S. PATENT DOCUMENTS

| | | | |
|---|---|---|---|
| 7,769,165 B2 * | 8/2010 | Jakubowski et al. | 380/28 |
| 2003/0202658 A1 * | 10/2003 | Verbauwhede | 380/43 |
| 2004/0202317 A1 * | 10/2004 | Demjanenko et al. | 380/28 |
| 2005/0213756 A1 * | 9/2005 | Hubert | 380/44 |
| 2009/0125997 A1 * | 5/2009 | Cook | 726/6 |

* cited by examiner

*Primary Examiner* — Christopher Brown
(74) *Attorney, Agent, or Firm* — Ante Deng

(57) ABSTRACT

A fast key-changing hardware apparatus, which generates one sub-key each clock cycle, which is used by advanced encryption system (AES) algorithm block cipher, is independent from the AES algorithm block cipher. The invented apparatus automatically generate expanded keys from the input cipher key, store them in the key expanded RAM and ready to be used by the AES algorithm block cipher. If the key changing and the key expanding speed in the fast key-changing device is as fast as the data block (i.e. 128, 192, or 256 bits) processing speed in the AES algorithm block cipher, the cipher system has the characteristic of one-time pad perfect cryptography. When using this device with a fixed key cipher system, the original input cipher key can be detached or destroyed from the system and guarantees the safety of the cipher key.

11 Claims, 1 Drawing Sheet

FAST KEY-CHANGING HARDWARE APPARATUS FOR AES BLOCK CIPHER

REFERENCES CITED [REFERENCED BY]

U.S. Patent Documents

| | | |
|---|---|---|
| 6,026,490 | February 2000 | Johns-Vano et al. |
| 6,937,727 | August 2005 | Yup et al. |
| 6,973,187 | December 2005 | Gligor et al. |
| 7,088,826 | August 2006 | Houlberg et al. |
| 7,106,860 | September 2006 | Yu et al. |
| 7,194,090 | March 2007 | Muratani et al. |
| 7,211,763 | May 2007 | Verbauwhede et al. |
| 7,337,314 | February 2008 | Hussain et al. |
| 7,539,876 | May 2009 | Henry et al. |
| 20010033656 | October 2001 | Gligor et al. |
| 20010050989 | December 2001 | Zakiya et al. |
| 20020101985 | August 2002 | Calvignac et al. |
| 20030039354 | February 2003 | Kimble et al. |
| 20030223580 | December 2003 | Snell et al. |
| 20040047466 | March 2004 | Feldman et al. |
| 20040202317 | October 2004 | Demjanenko et al. |

OTHER REFERENCES

Jorg J. Buchholz, "MATLAB Implementation of the Advanced Encryption Standard", http://buchholz.hs-bremen.de, Dec. 19, 2001. cited by other.

Behrouz A. Forouzan, "Cryptography and Network Security", pp 207-212, 2008. cited by other.

Primary Examiner:
Assistant Examiner:

DESCRIPTION

Background of the Invention (a) Field of the Invention

The invention involves a cryptographic apparatus, a symmetric key block cipher algorithm known as Rijndael or AES and its hardware implementation. The invention allows on-the-fly cipher key changing in both encryption and decryption directions. If the plaintext/ciphertext block encryption/decryption rate is as fast as the input cipher key-changing rate while the cipher key is not repeated, the invention has the property of one-time-pad perfect block cipher system.

(b) Description of the Prior Arts

People discovered that media content encryption is necessary when identity theft increased. There is a lot of content encryption algorithms exist on the market. AES is the newest cryptography standard that National Institute of Standards and Technology (NIST) authorized and has not been broken yet. Therefore it is the most secure algorithm today. There is another algorithm which makes decipher difficult to decrypt the content of a message is called one-time pad perfect encryption. This perfect encryption algorithm requires to change the cipher key each time the input plaintext changes, and the cipher key is not repeated. The invented apparatus implements these two algorithms and tries to form a most secured encryption/decryption device.

Most of the AES algorithm hardware apparatus design was concentrated on high throughput, high performance, and low latency capability. In order to achieve the request for high throughput, the expanded key generator and the AES algorithm block cipher are normally bonded together and operates synchronously. In other words, the AES algoritlun block cipher needs the key generator generates a round of sub-key simultaneously to implement one round of AES algorithm for the input plaintext. Therefore, the input cipher key needs to be attached to the cipher system at all time. Since the key is outside of the cipher system, leaves thieves opportunity to steal the cipher key. The high throughput/high performance architecture mentioned above gives up the key changing flexibility and key security ability.

The apparatus invented is to solve the problems mentioned above. Its circuit architecture separates the expanded key generator and AES algorithm block cipher These two modules operate asynchronously. The fast key changing hardware apparatus generates a whole set of expanded sub-keys only once for one input cipher key it has the ability to expand one sub-key each clock cycle and its input cipher key can be changed on the fly. As the input cipher key changed, the key generator will expand another set of sub-keys according to the changed cipher key. The expanded sub-keys are stored in an expanded key RAM. The AES algorithm block cipher can retrieve its round key accordingly. When the input cipher key-changing rate is matched with the plaintext/ciphertext block encryption/decryption rate, the cipher system is a one-time-pad perfect cryptography block cipher system. When using this system as a fixed key cipher, the original input cipher key can be detached or destroyed from the system since the expanded keys are already stored in the build-in expanded key RAM and is not accessible from outside of the system.

SUMMARY

A fast key-changing device is invented and solves the problem mentioned above. It is independent from the AES algorithm block cipher. The key-changing device has the capability to generate one sub-key each clock cycle. The expanded keys are stored in an expanded key RAM and are ready for AES algorithm block cipher to retrieve it. The cipher key-changing rate can be matched with the AES algorithm block cipher encryption rate and forms a one-time pad perfect cryptography system. The circuit architecture of this fast key-changing hardware apparatus and the AES algorithm block cipher module can be different in many ways. The architecture described above is only an illustration. It may be modified within the scope and equals to the appended claims.

DETAILED DESCRIPTIONS

Figure 1:
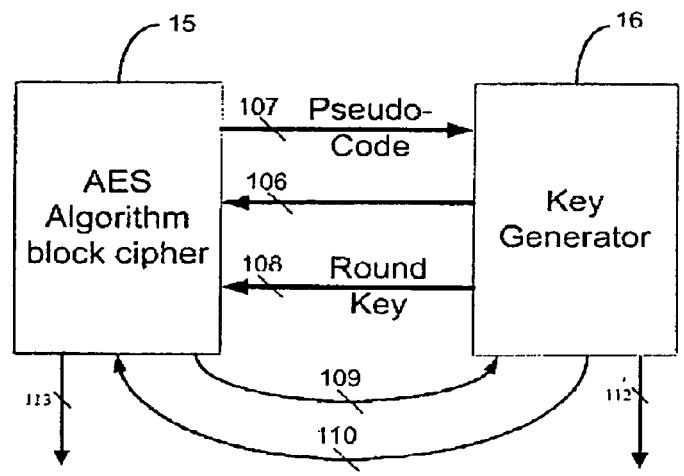
FIG. 1 is a diagram showing the interaction between the AES algorithm block cipher and the fast key-changing hardware apparatus.

A fast key-changing hardware apparatus 16 in FIG. 1 is also called a key generator is independent from the AES algorithm block cipher 15. that the AES algorithum block cipher 15 uses a sub-round key, which is generated by the generator 16, to process a round of AES algorithm to the inputting plaintext block every clock cycle. The AES algorithm block cipher 15 will start its operation after it receives the "ready" signal 106 from the key generator 16. The ready signal 106 is to inform the AES algorithm block cipher 15 the expanded keys (i.e., 128, 192, 256 bits) are stored and ready in the expanded key RAM 14 in FIG. 2. The key generator 16 and The AES algorithm block cipher 15 operate asynchronously.

Figure 2:
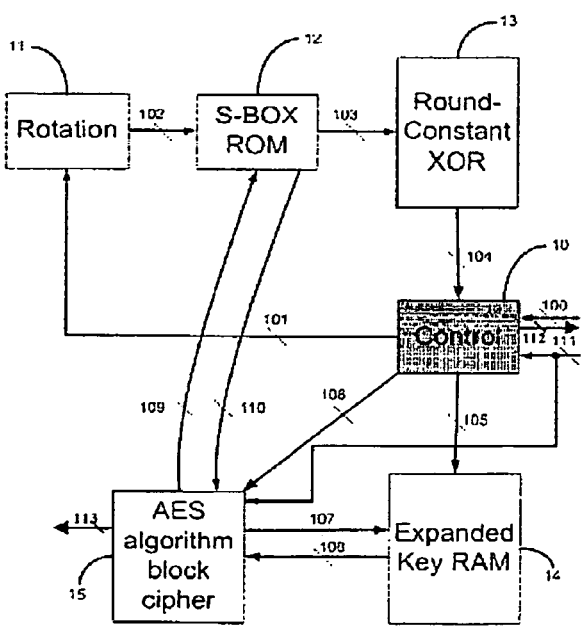
FIG. 2 is a diagram showing the data flow within the fast key-changing hardware apparatus generator and the interface with the AES algorithm block cipher.

The AES algorithm block cipher 15 sends pseudo codes 107 to the key generator 16 and the expanded key RAM 14 in FIG. 2 will send the correspond sub-key 108 back to the AES algorithm block cipher 15. This sub-key retrieving process is done within one clock cycle. The AES algorithm block cipher 15 also sends data addresses 109 to the S-box ROM 12 in the key generator 16 and retrieving a correspond substitution value 110 back. The operation for retrieving a substitution value is also finished within one clock cycle.

When the cipher key 100 changing process starts, the FSM controller 10 in FIG. 2 as well as the AES algorithm block cipher 15 receives a reset signal 111 and resets their registers. The FSM controller 10 automatically starts the key expansion process right after the end of the reset signal 111. The FSM controller 10 stores the newly updated sub-key 105 into the expanded key RAM 14 as well as sends the proper sub-key into the feedback loop according to the AES algorithm. Since the expanded key RAM 14 is a build-in memory circuit, it is not accessible from outside of the key generator module. Therefore the input cipher key can be detached or destroyed from the key generator module after the expanded keys are stored in the RAM 14. Thus prevents the input cipher key from being stolen. The feedback loop 101 102 103 104 includes the rotation module 11, the S-box ROM module 12, and the round-constant XOR module 13, and the FSM controller 10. The feedback loop circuits, except the FSM controller 10, are all combinational logic circuits. Therefore there is no clock drive through the circuits and the loop fnishes its operation in one clock cycle.

What is claimed is:

1. A fast key-changing hardware apparatus comprising:

An advanced encryption system (AES) algorithm block cipher in a hardware implementation that uses a specific sub-key each clock cycle, a rotation module which rotates the specific sub-keys, an S-box read only memory (ROM) which stores a plurality of substitution variables, a round constant module which stores a round constant and performs an XOR operation on said round constant with said specific sub-key, a finite state machine (FSM) controller that expands an input cipher key into a set of specific sub-keys, and an expanded key random access memory (RAM) which stores the expanded set of specific sub-keys;

wherein said rotation module, said S-box ROM, said round constant module, and said FSM controller form a closed feedback loop;

wherein the AES algorithm block cipher uses a non-repeating input cipher key stream and matches an input cipher key changing rate with a data block encryption rate to form a one-time pad cryptography system;

wherein said FSM controller and said AES algorithm block cipher operate asynchronously; and wherein the input cipher key is stored in an input cipher key register, and is destroyed one clock cycle after the AES algorithm block cipher receives a reset signal.

2. The key-changing apparatus of claim 1, wherein said rotation module, said S-box ROM, said round constant module, and said expanded key RAM, have no clock input.

3. The key-changing apparatus of claim 1, wherein said S-box ROM contains a duplicated sub-S-box as needed according to the size of the AES data block and its key length.

4. The key-changing apparatus of claim 1, wherein said expanded sub-key RAM contains a duplicate expanded sub-key RAM as needed according to the size of the AES data block and its key length.

5. The key-changing apparatus of claim 1, wherein said FSM controller, and said AES algorithm block cipher receive a reset signal and reset the entire content of their registers.

6. The key-changing apparatus of claim 1, wherein said FSM controller automatically starts said sub-key expansion process after it receives a reset signal.

7. The key-changing apparatus of claim 1, wherein said FSM controller generates and sends a ready signal to the said AES algorithm block cipher after the expanded sub-keys are generated.

8. The key-changing apparatus of claim 1, wherein the AES algorithm block cipher performs one round of the AES algorithm every clock cycle.

9. The key-changing apparatus of claim 1, wherein a different set of expanded sub-keys is provided to said AES algorithm block cipher each time the input cipher key changes.

10. The key-changing apparatus of claim 1, wherein said FSM controller together with said AES algorithm block cipher are implemented as an encryption or decryption system, wherein said encryption system and said decryption system comprise two different modules.

11. The key-changing apparatus of claim 10, wherein a first input cipher key for said encryption module, and a second input cipher key for said decryption module can be different values simultaneously.

\* \* \* \* \*